(12) United States Patent
Liu et al.

(10) Patent No.: US 7,681,893 B2
(45) Date of Patent: Mar. 23, 2010

(54) FOLDING SUPPORT FOR TABLE MACHINE

(75) Inventors: Chia-Sheng Liu, Chiayi County (TW); Chen-Yuan Chen, Taichung County (TW)

(73) Assignee: Durq Machinery Corp., Taichung (TW)

( * ) Notice: Subject to any disclaimer, the term of this patent is extended or adjusted under 35 U.S.C. 154(b) by 457 days.

(21) Appl. No.: 11/717,096

(22) Filed: Mar. 13, 2007

(65) Prior Publication Data
US 2008/0067300 A1    Mar. 20, 2008

(30) Foreign Application Priority Data
Sep. 18, 2006    (TW) ............................... 95134489 A

(51) Int. Cl.
*B62B 1/00* (2006.01)
*B62B 1/04* (2006.01)

(52) U.S. Cl. ......................................... 280/35; 280/641

(58) Field of Classification Search ................... 280/35, 280/638, 29, 33.996, 47.18, 47.35, 38, 639, 280/43.1, 641, 652, 645, 47.24, 47.2, 30, 280/47.17; 248/439, 647, 676
See application file for complete search history.

(56) References Cited

U.S. PATENT DOCUMENTS

| | | | | | |
|---|---|---|---|---|---|
| 2,207,923 | A | * | 7/1940 | Kelso ........................... | 182/156 |
| 2,841,409 | A | * | 7/1958 | Osier ........................... | 280/645 |
| 3,223,429 | A | * | 12/1965 | Hastings ...................... | 280/641 |
| 3,493,262 | A | * | 2/1970 | Ferneau ........................ | 296/20 |
| 3,498,628 | A | * | 3/1970 | Ferneau et al. .............. | 280/641 |
| 3,669,031 | A | * | 6/1972 | Cole ............................ | 108/102 |
| 4,192,541 | A | * | 3/1980 | Ferneau ........................ | 296/20 |
| 4,278,243 | A | * | 7/1981 | Alessio ........................ | 269/16 |
| 4,369,985 | A | * | 1/1983 | Bourgraf et al. ............ | 280/641 |
| 6,578,856 | B2 | * | 6/2003 | Kahle ........................... | 280/30 |
| 6,769,674 | B2 | * | 8/2004 | Chang ......................... | 269/139 |
| 6,883,267 | B1 | * | 4/2005 | Pruitt .......................... | 43/54.1 |
| 6,942,229 | B2 | * | 9/2005 | Brazell et al. ................. | 280/30 |
| 7,077,421 | B2 | * | 7/2006 | Wu .............................. | 280/645 |
| 7,131,364 | B2 | * | 11/2006 | Brazell ....................... | 83/477.2 |
| 7,222,865 | B2 | * | 5/2007 | Chen et al. ................... | 280/30 |
| 7,255,355 | B2 | * | 8/2007 | Chisholm et al. ............. | 280/30 |
| 7,464,956 | B2 | * | 12/2008 | Chen et al. .................. | 280/639 |
| 7,588,255 | B2 | * | 9/2009 | Katz ........................ | 280/47.27 |
| 2002/0011719 | A1 | * | 1/2002 | Eskridge ..................... | 280/651 |
| 2006/0038383 | A1 | * | 2/2006 | Wu .............................. | 280/652 |
| 2006/0076756 | A1 | * | 4/2006 | Wu .............................. | 280/652 |
| 2006/0145045 | A1 | * | 7/2006 | Chisholm et al. ........... | 248/439 |

* cited by examiner

*Primary Examiner*—Lesley Morris
*Assistant Examiner*—Chiedu A Chibogu
(74) *Attorney, Agent, or Firm*—Bacon & Thomas, PLLC

(57) ABSTRACT

A folding support settable between an extended position and a received position is disclosed to include a rack for holding thereon a table machine, a pair of first legs and a pair of second legs respectively pivoted to the rack for supporting the rack above the floor, two first links respectively pivoted to the rack, and two second links respectively pivoted to the second legs and the first links. The first links and the second links are moved with the second legs toward the first legs when receiving the folding support, and at the same time the first links are stopped against the first legs, assuring safety of the receiving action.

11 Claims, 14 Drawing Sheets

FOLDING SUPPORT FOR TABLE MACHINE

BACKGROUND OF THE INVENTION

1. Field of the Invention

The present invention relates generally to support means for supporting a table machine, and more particularly, to a folding support, that allows utilization of the weight of the table machine that is supported on the folding support to share the force necessary for folding the folding support into the received status.

2. Description of the Related Art

FIGS. 1-3 show a conventional mobile table machine stand 2 for supporting a table machine, for example, table saw 1. The mobile table machine stand 2 comprises a platform 3 carrying the table saw 1, a pair of first legs 4 each having one end respectively pivoted to the platform 3 by a pin 2a and connected to a handle 4a and the other end terminating in a bearing portion 4b for touching the floor, a pair of second legs 5 each having one end respectively pivoted to the first legs 4 by a pin 2b and terminating in an extension 5b and the other end mounted with a wheel 5a, and a pair of connecting members 6 each having the two distal ends respectively pivoted to the platform 3 and the extension 5b of the second legs 5 by pins 2c and 2d. By means of the aforesaid arrangement, the mobile table machine stand 2 can be alternately set between the extended position shown in FIG. 1 and the received position shown in FIG. 3.

The design of the aforesaid mobile table machine stand 2 allows utilization of the weight of the table saw 1 to share the force F1 necessary for folding the mobile table machine stand 2 into the received position. However, when the bearing portions 4b of the first legs 4 are stopped at the floor, the table saw 1 is kept in a tilted position, and the center of gravity W of the table saw 1 is offset from the pivot points, i.e. pins 2b, between the first legs 4 and the second legs 5 (see FIG. 2), if the grasp force F2 applied by the user to the handle 4a cannot sustain the downward pressure of the table saw 1, the second legs 5 will be forced to move toward the first legs 4 rapidly, and the elastic force of the springs 7 between the first legs 4 and the second legs 5 will accelerate the movement of the second legs 5 toward the first legs 4, resulting in a potential accident.

Further, when the mobile table machine stand 2 is extended out, the shank 8a of each T-shaped lock member 8 is respectively inserted through a through hole 4c on each first leg 4 and a through hole 9a on a respective locating plate 9 that is respectively welded to each of the second legs 5 to lock the first legs 4 and the second legs 5, preventing movement of the second legs 5 toward the first legs 4. When the mobile machine stand 2 is in the received position, the shanks 8a of the T-shaped lock members 8 are respectively stopped at the extensions 5b of the second legs 5 preventing movement of the second legs 5 relative to the first legs 4. The T-shaped lock members 8 provide a locking function. However, it is difficult to align the through holes 4c of the first legs 4 with the through holes 9a on the locating plates 9 at the second legs 5. Further, the T-shaped lock members 8 must be pulled out of the locking position or pushed into the locking position when extending out or receiving the mobile table machine stand 2. Further, a shearing force may be produced between the first legs 4 and the second legs 5 due to an accidental impact of the mobile table machine stand 2, thereby damaging the T-shaped lock members 8.

Therefore, the aforesaid conventional mobile table machine stand is not satisfactory in function.

SUMMARY OF THE INVENTION

The present invention has been accomplished under the circumstances in view. It is one objective of the present invention to provide a folding support, which allows utilization of the weight of the table machine to share the force necessary for folding the folding support into the received status, assuring safety operation.

To achieve this objective of the present invention, the folding support provided by the present invention can be alternatively set between an extended position and a received position, and is adapted to support a table machine above the floor. The folding support comprises a rack for the mounting of a table machine. The rack has a first pivot point, a second pivot point and a third pivot point orderly arranged at each of left and right sides thereof. A pair of first legs each have a first end pivoted to one of the first pivot points of the rack and a second end with a bearing portion for supporting on the floor. A pair of second legs each have a first end pivoted to one of the second pivot points of the rack and a second end pivotally mounted with a wheel. A pair of first links each have a first end pivoted to one of the third pivot points of the rack, and a second ends stopped against one of the first legs. A pair of second links each have a first end pivoted to one of the first links close to the second ends of the first links, and a second end pivoted to one of the second legs. When the folding support is in the extended position, the first legs and the second legs are kept in a crossed manner to hold the rack in horizontal substantially. When the folding support is moved from the extended position toward the received position, the first links and the second links are moved with the second legs toward the first legs. When the folding support is in the received position, the wheels are kept close to the bearing portions of the first legs and the rack is kept in vertical substantially.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 7:
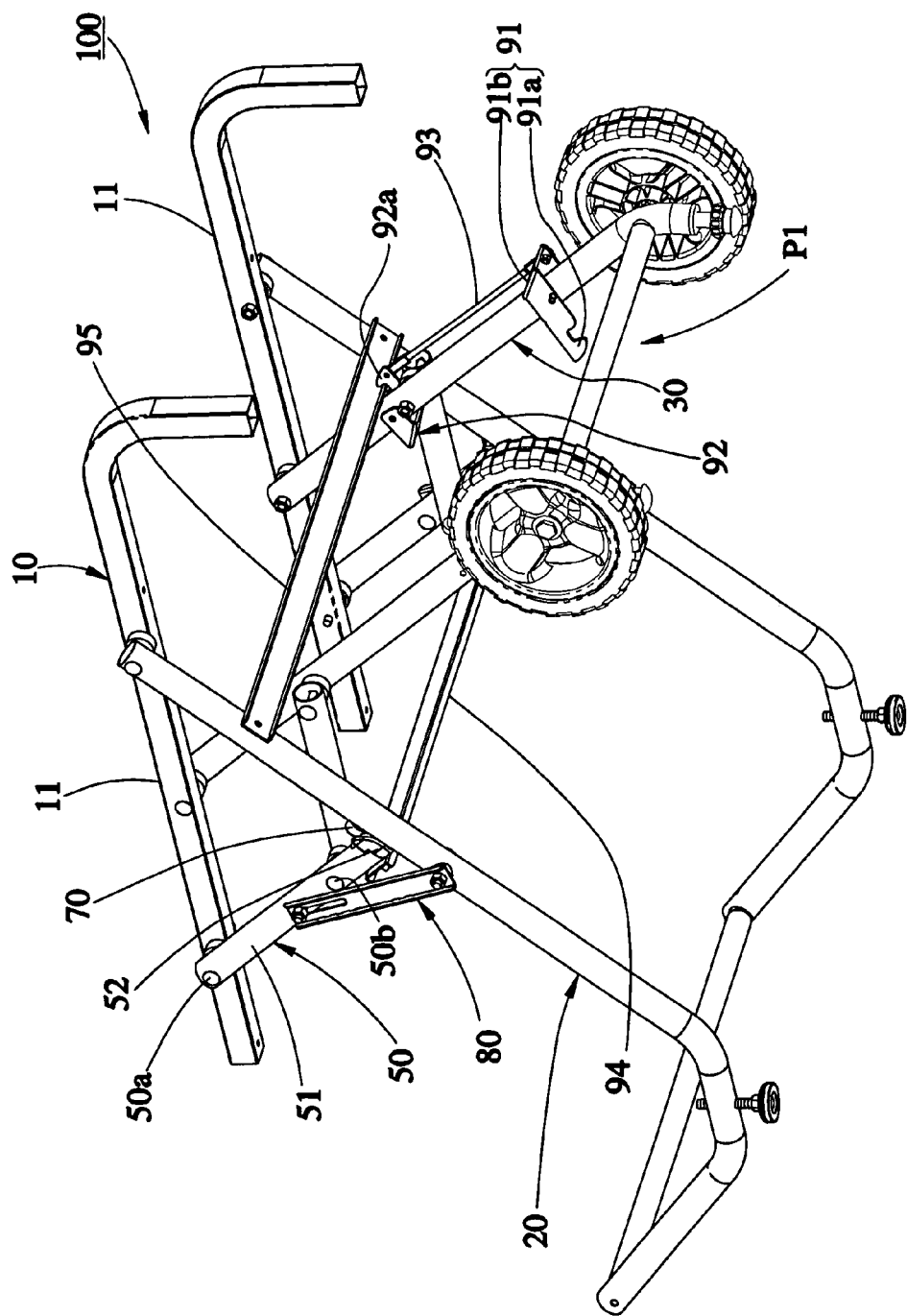
FIG. 7 corresponds to FIG. 6 when viewed from another angle.
Figure 8:
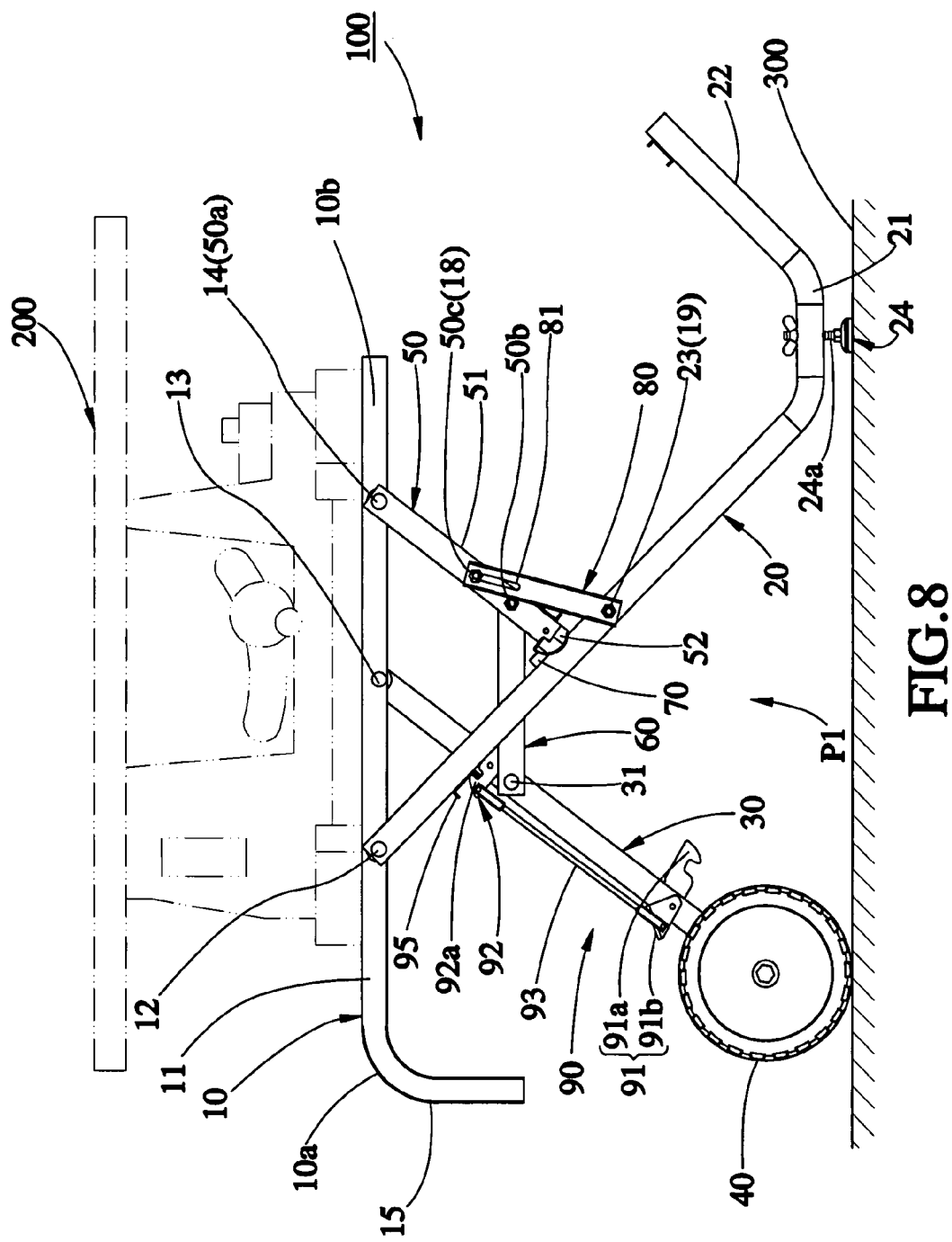
FIG. 8 is a schematic side plan view showing the folding support is set in the extended position.
Figure 9:
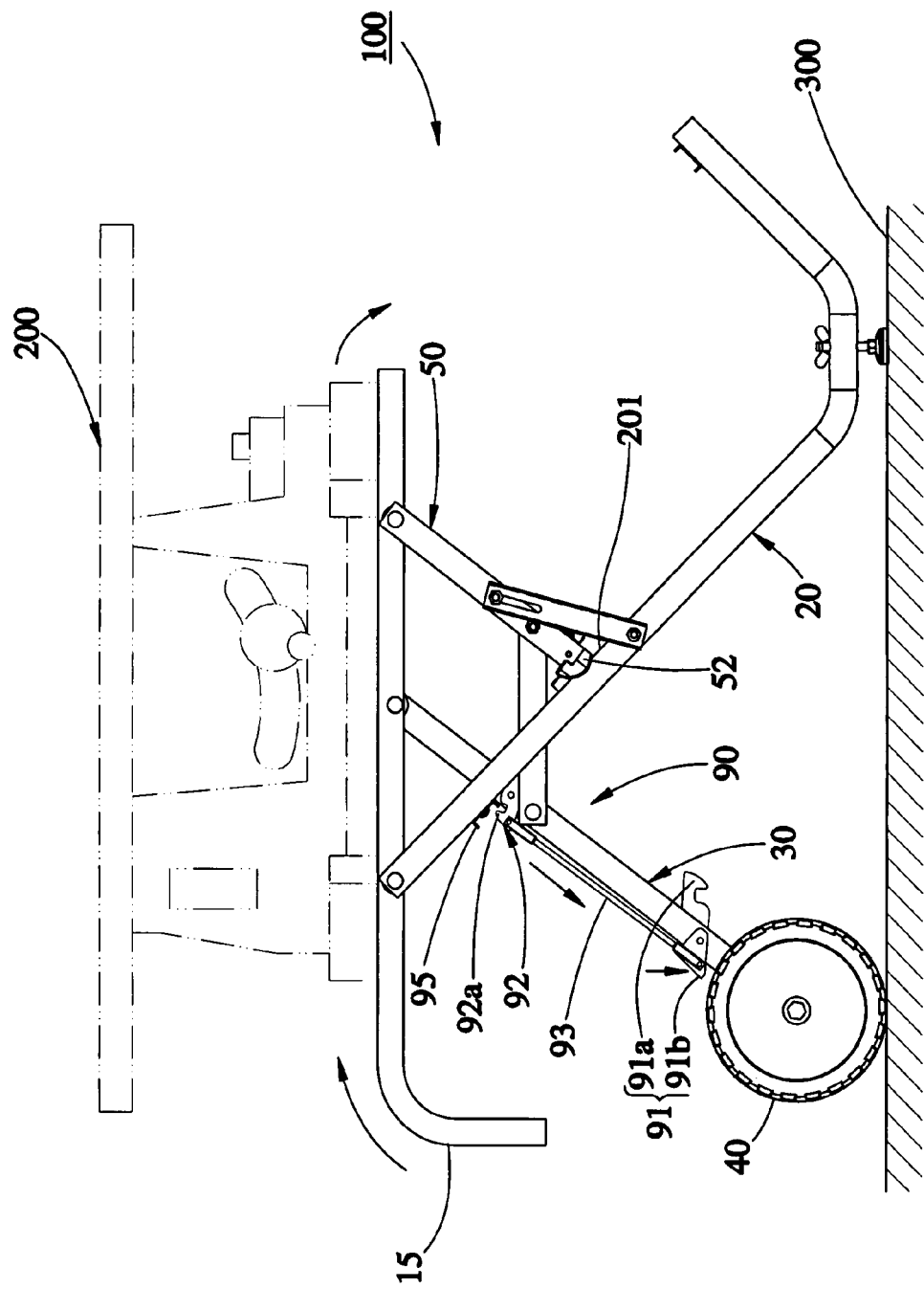
FIG. 9 is a schematic side plan view showing the folding support is unlocked for folding from the extended position.
Figure 10:
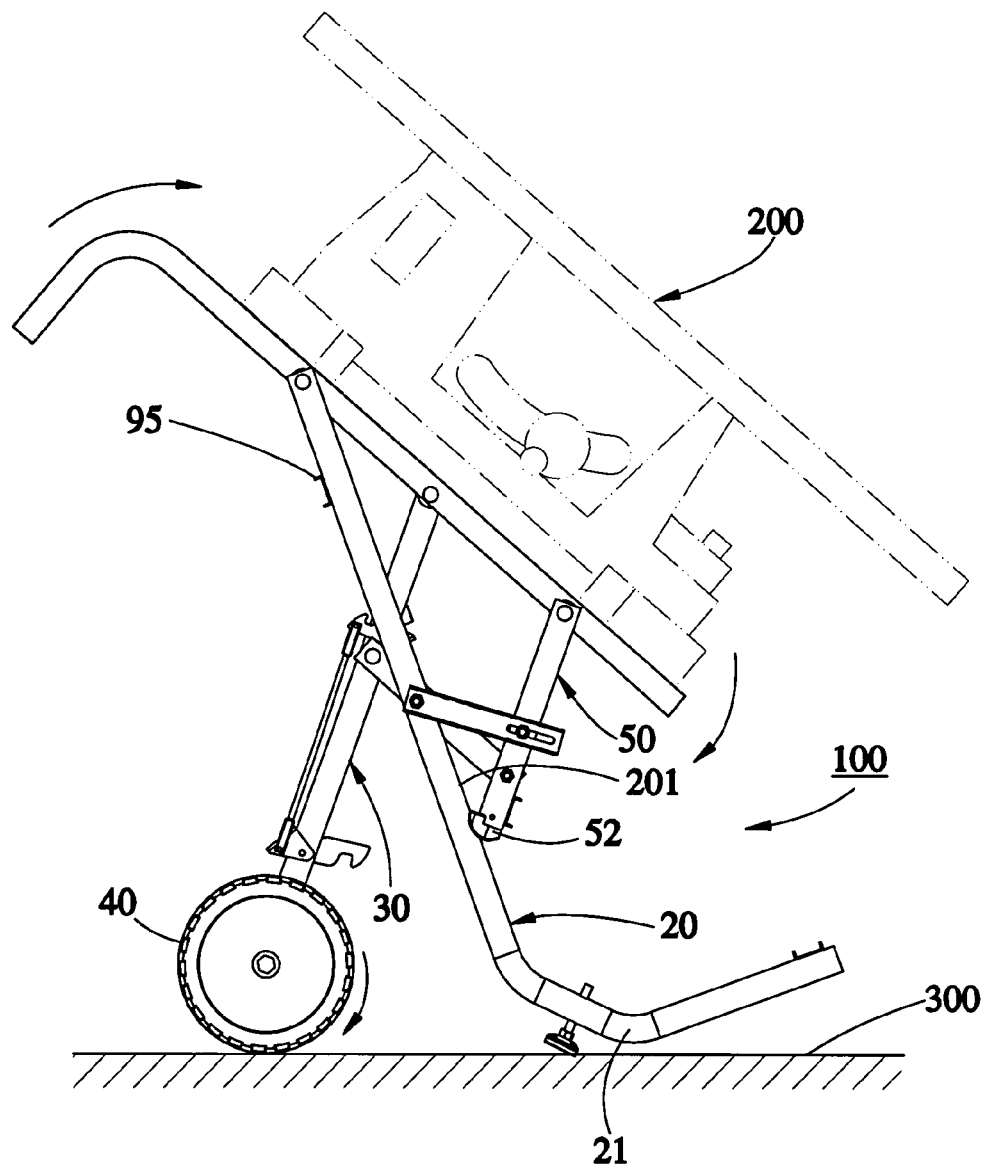
FIG. 10 is a schematic side plan view showing the folding support is folded to a tilting posture.
Figure 11:
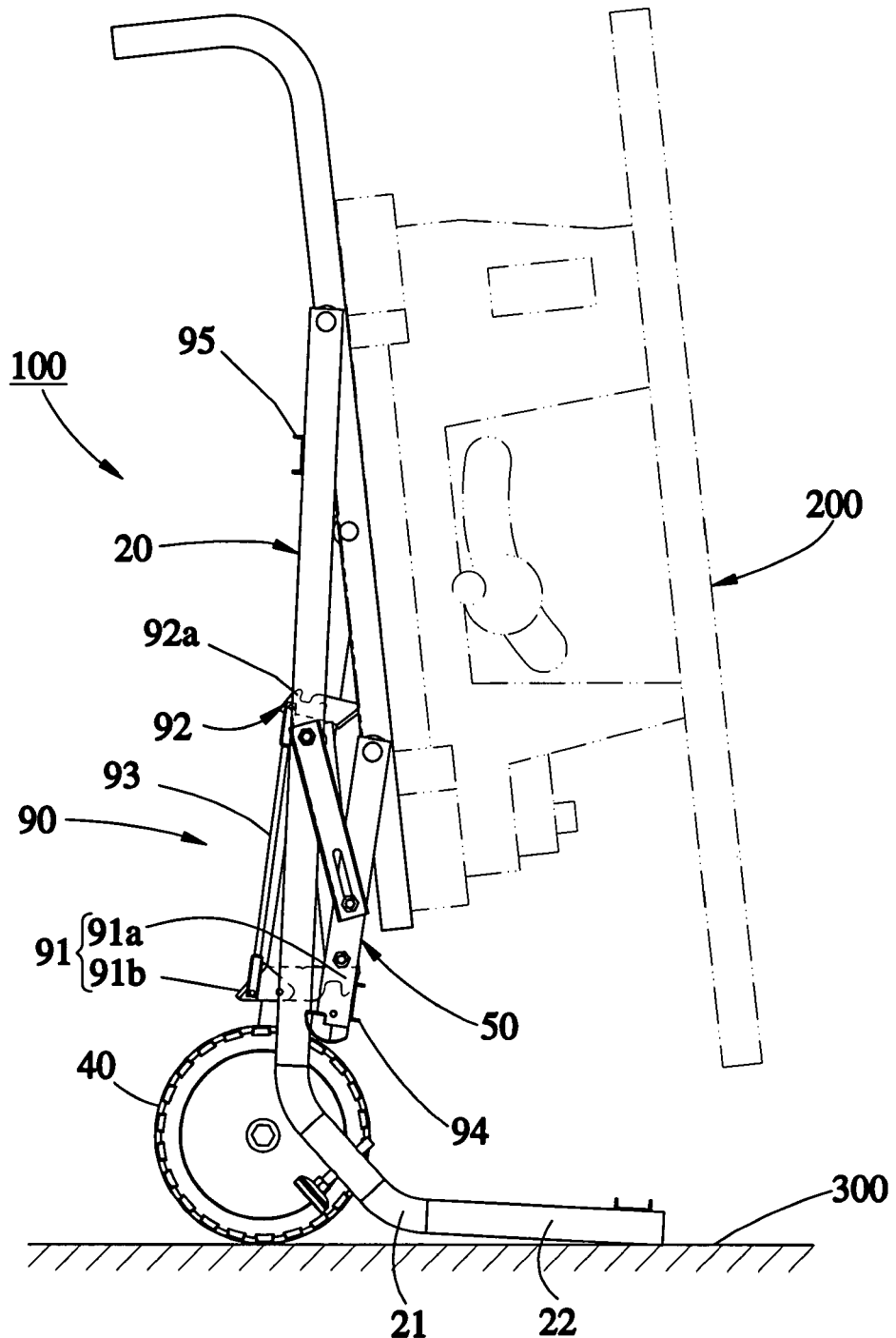
FIG. 11 is a schematic side plan view showing the folding support is set in the received position.
Figure 12:
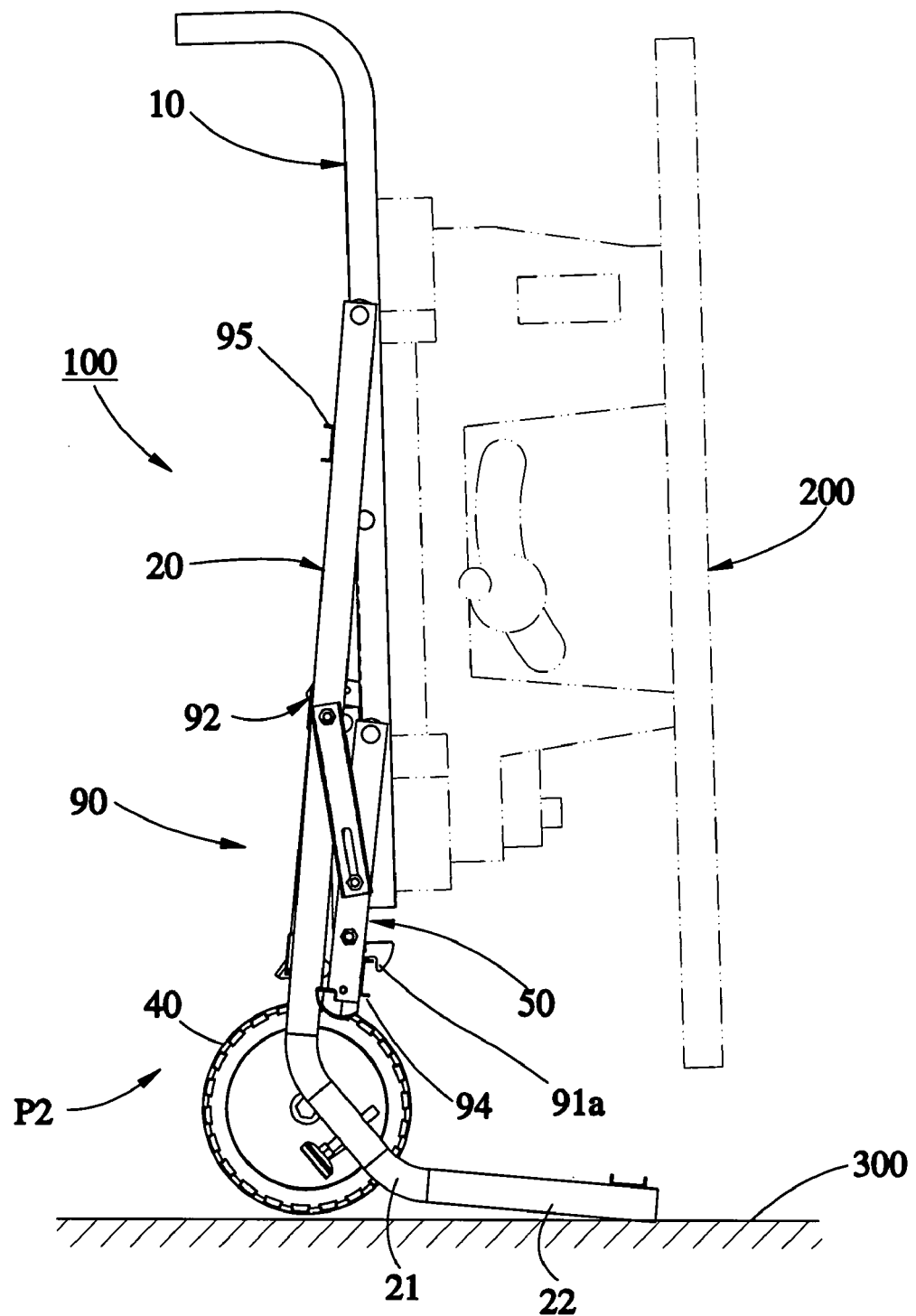
FIG. 12 is a schematic plan view showing the folding support is set in the received position and locked.
Figure 13:
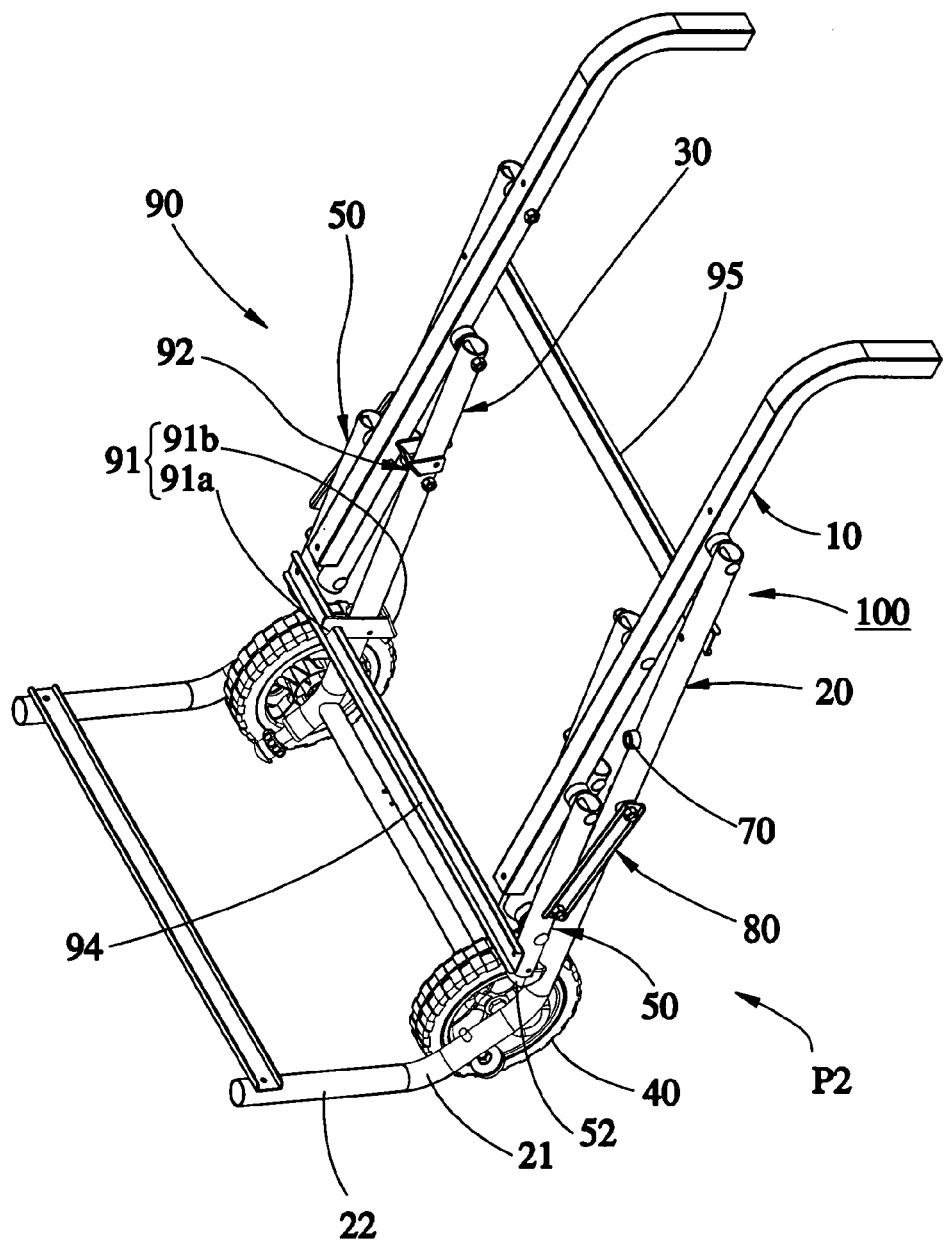
FIG. 13 is a perspective view of FIG. 12.

As shown in FIGS. 4-13, a folding support 100 in accordance with a preferred embodiment of the present invention is used for supporting a table machine, for example, table saw 200 above the floor 300, and it can be alternatively set between an extended position P1 shown in FIG. 8 and a received position P2 shown in FIG. 12.

The folding support 100 comprises a rack 10, a pair of fist legs 20, a pair of second legs 30, two wheels 40, two first links 50, two second links 60, two stop members 70, a pair of connecting members 80 and a lock 90.

The rack 10 includes two transverse rods 11 that are kept apart and arranged in parallel. Each transverse rod 11 has a front end 10a, a rear end 10b, and a plurality of pivot points, namely, the first pivot point 12, the second pivot point 13 and the third pivot point 14 spaced between the front end 11a and the rear end 10b. The front end 11 curves downwards, thereby forming a grip 15 for the holding by the user's hand. The table saw 200 is fastened to the transverse rods 11 with pins 16.

When the folding support 100 is in the extended position P1, the rack 10 is substantially kept in horizontal. When the folding support 100 is in the received position P2, the rack 10 is substantially kept in vertical.

The first legs 20 each have one end respectively pivoted to the first pivot points 12 of the transverse rods 11 of the rack 10 at an outer side relative to the transverse rods 11 and the other end curved and provided with a bearing portion 21 and a stop portion 22. Further, each first leg 20 has a connecting point 23 on the middle.

When the folding support 100 is in the received position P2, the stop portion 22 is stopped at the floor 300, thereby supporting the table saw 200. Further, each first leg 20 has fixedly mounted thereon a block-like stop member 70.

The second legs 30 each have one end respectively pivoted to the second pivot points 13 of the transverse rods 11 of the rack 10 at an inner side relative to the transverse rods 11 and the other end mounted with one of the wheels 40. Each second leg 22 further has a connecting point 31 on the middle. As shown in FIG. 8, the first legs 20 and the second legs 30 are arranged in a crossed manner when the folding support 100 is in the extended position P1. When the folding support 100 is in the received position P2 as shown in FIG. 12, the wheels 40 are kept close to the bearing portions 23 of the first legs 20 respectively.

The first links 50 each have a first end 50a and a second end 50b. According to this embodiment, each first link 50 in formed of a bar member 51 and a sliding cap 52. The top ends of the bar members 51, i.e., the first ends 50a of the first links 50 are respectively pivoted to the third pivot points 14 of the transverse rods 11 of the rack 10 at an outer side relative to the transverse rods 11 on the same vertical plane as the first legs 20. The bar member 51 has a first connecting point 50b and a second connecting point 50c. The sliding cap 52 is coupled to the bottom end of the bar member 51, having an arched contact surface 521 fitting the smoothly curved periphery 201 of the associating first leg 20. The arched contact surface 521 constitutes the second end 50d of the respective first links 50. When the folding support 100 is in the extended position, the first links 50 are respectively stopped against the stop members 70.

The second links 60 are set between the first legs 30 and the first links 50, each having one end respectively pivoted to the first connecting ends 50b of the first links 50 and the other end respectively pivoted to the connecting points 31 of the second legs 30. As shown in FIG. 8, the first links 50 are substantially kept in parallel to the second legs 30, and the second links 60 are substantially kept in parallel to the transverse rods 11, thereby constituting a parallel four-bar linkage. At this time, each first link 50 defines with the associating first leg 20 a 90° contained angle.

The connecting members 80 are long bars, each having an elongated sliding slot 81 and a through hole 82. A first pin 18 is respectively inserted through the elongated sliding slot 81 of each connecting member 80 and pivoted to the second pivot point 50c of the associating first link 50. A second pin 19 is respectively inserted through the through hole 82 of each connecting member 80 and pivoted to the connecting point 23 of the associating first leg 20. The connecting members 80 reinforce the strength of the folding support 100.

When the user holds the grips 15 with the hands to tilt the table saw 200, applying an upward pressure to the grips 15 will fold the folding support 20 from the extended position to the received position gradually, and by means of the weight of the table saw 200, the user can conveniently change the table saw 200 from the horizontal position to the vertical position for easy movement of the folding support 100 with the table saw 200 to another work place. By means of controlling the applied force to the grips 15, the tilting speed of the table saw 200 is controlled. Further, contact of the sliding caps 52 of the first links 50 with the first legs 20 smoothens the tilting movement of the table saw 200 from the horizontal position to the vertical position. Therefore, the user can control the receiving speed of the folding support 100 by oneself, preventing sudden falling of the table saw 200 from the horizontal position to the vertical position and a potential accident.

Further, an adjusting device 24 may be mounted in each first leg 20 near the bearing portion 21 to adjust the elevation of each first leg 20 on the floor 300. According to this embodiment, the adjusting devices 24 are adjusting screws, each having a threaded shank 24a threaded into the corresponding first leg 20. By means of rotating the adjusting devices 24 forwards or backwards relative to the respective first legs 20, fine adjustment of the elevation of the first legs 20 on the floor 300 is done.

Figure 1:
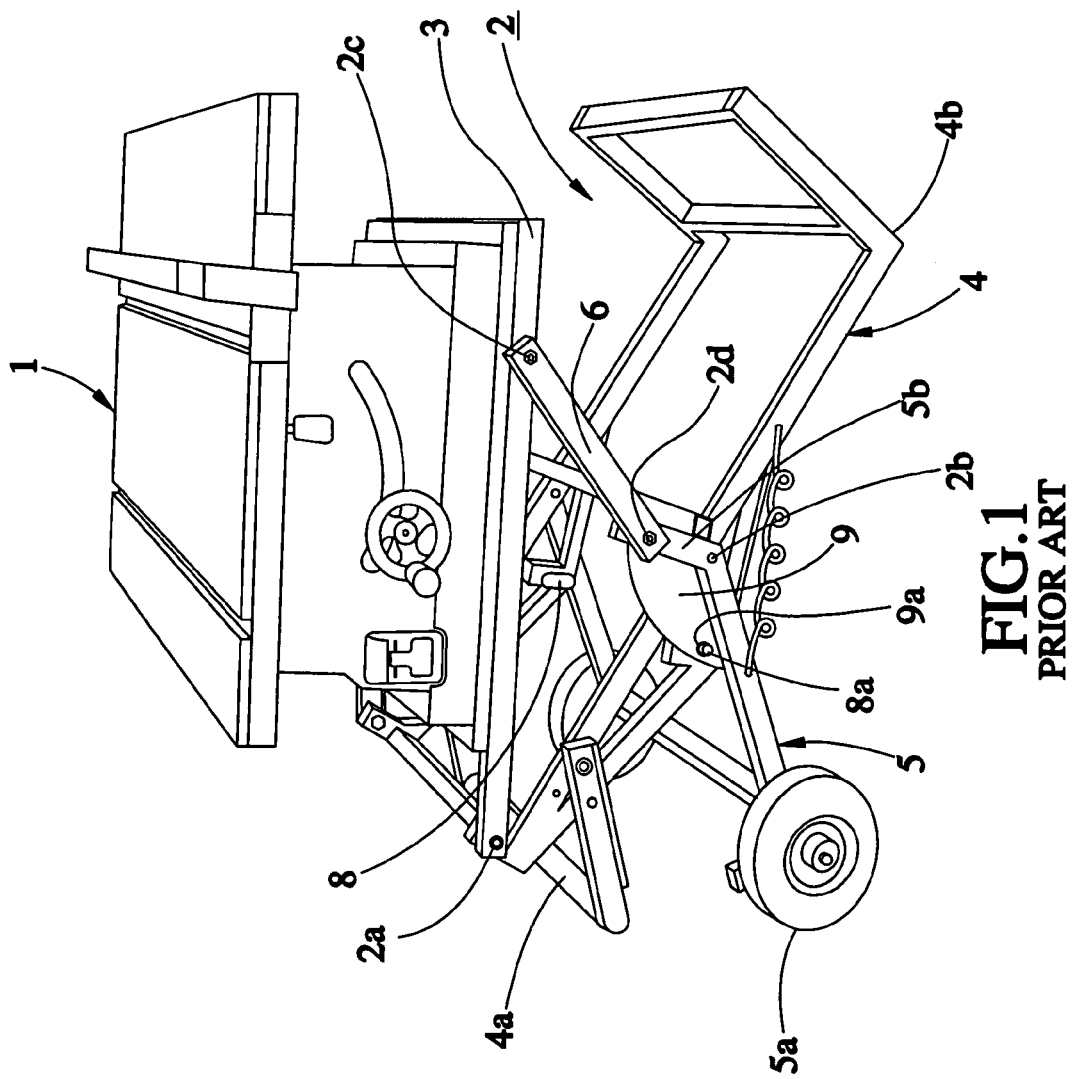
FIG. 1 is a schematic drawing of a mobile table machine stand according to the prior art.
Figure 2:
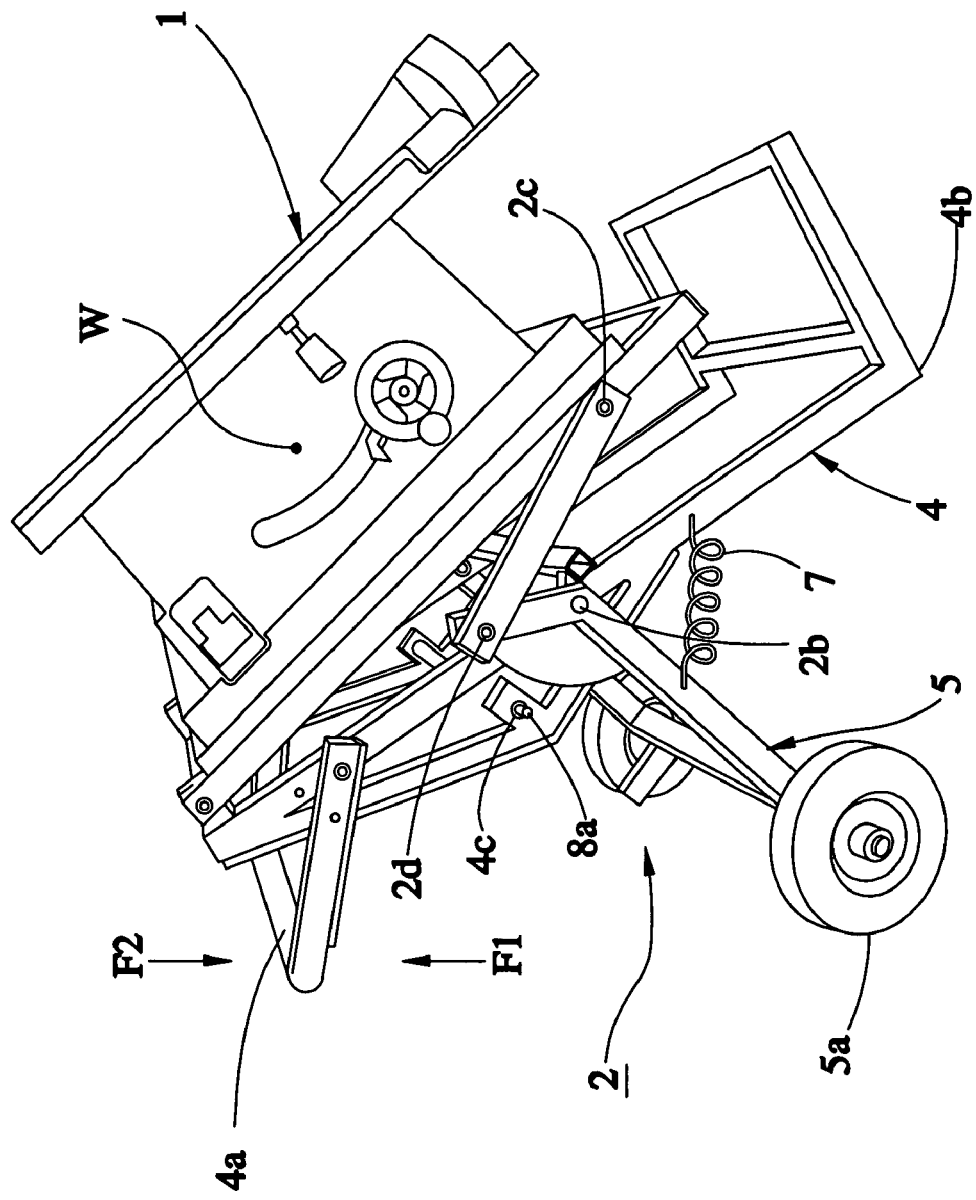
FIG. 2 is a schematic drawing showing a receiving action of the mobile table machine stand according to the prior art.
Figure 3:
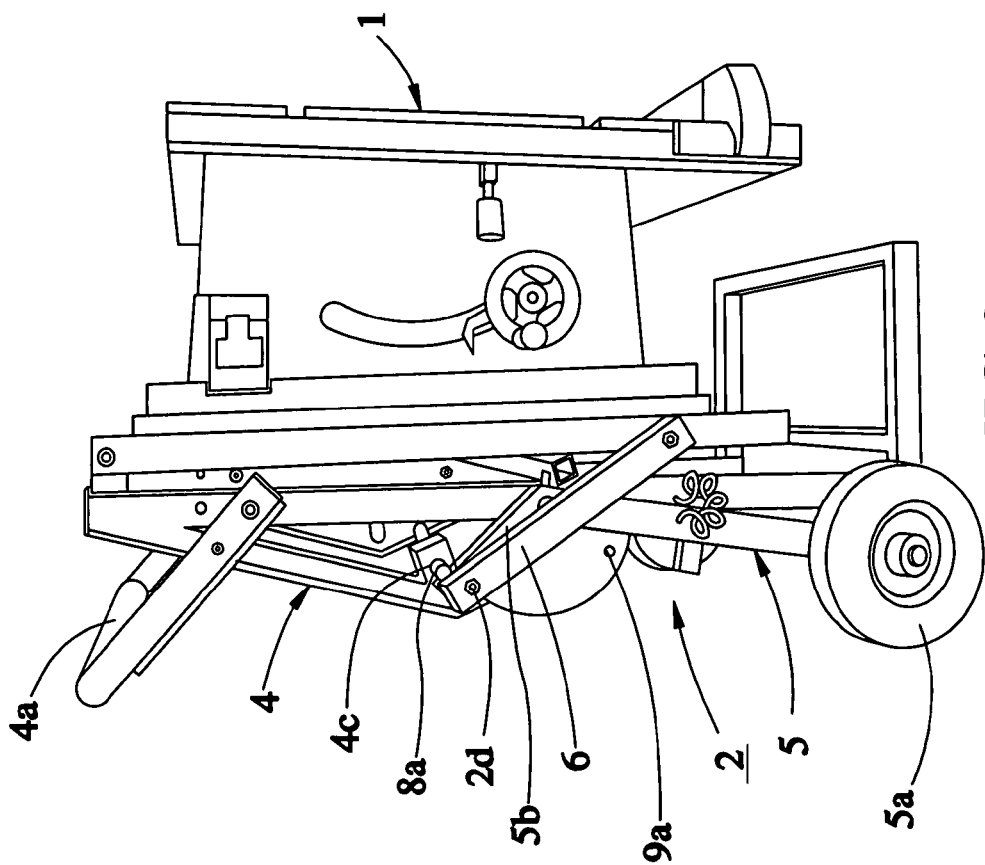
FIG. 3 is a schematic drawing showing received status of the mobile table machine stand according to the prior art.
Figure 4:
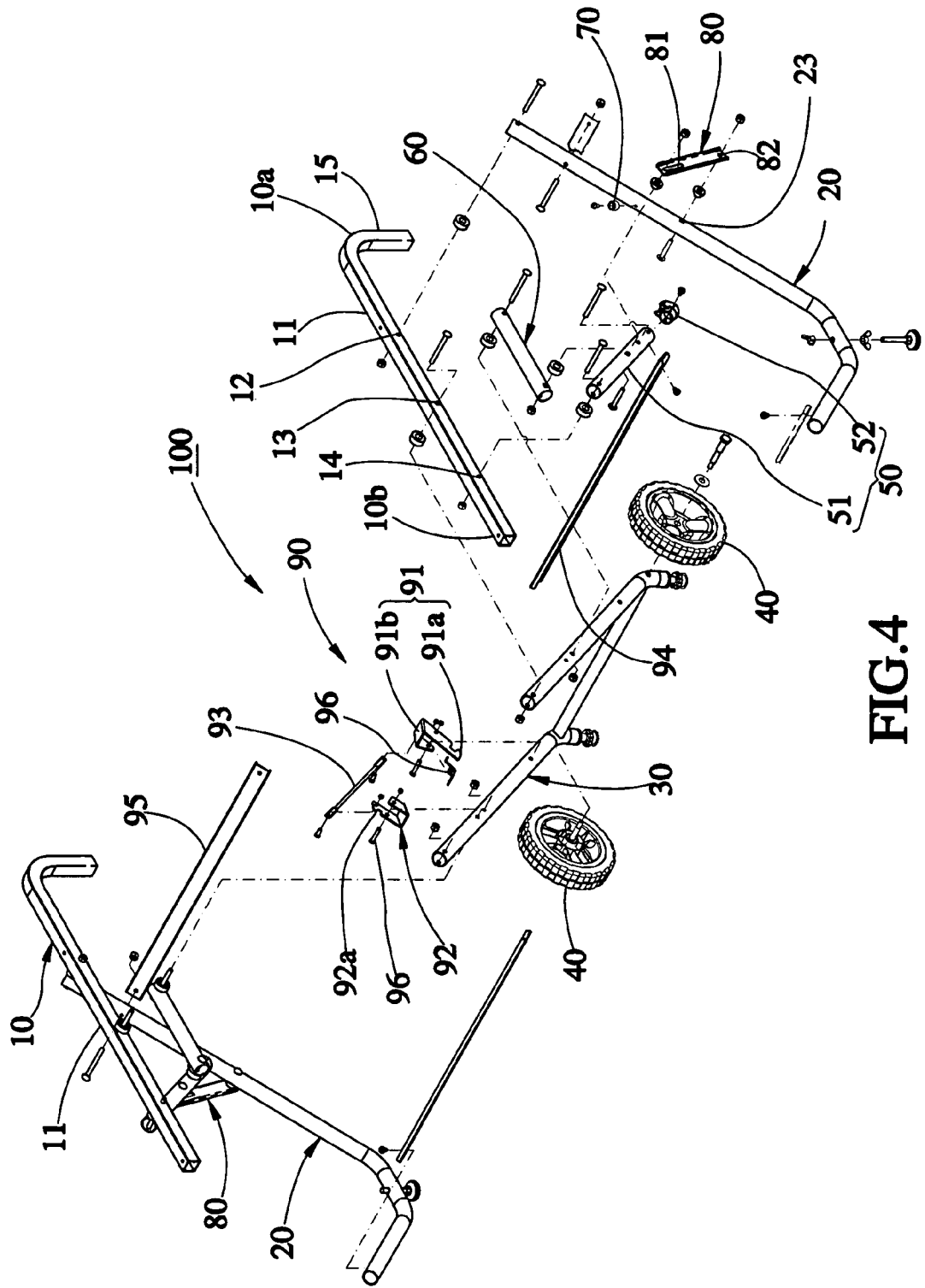
FIG. 4 is an exploded view of a folding support in accordance with a preferred embodiment of the present invention.
Figure 5:
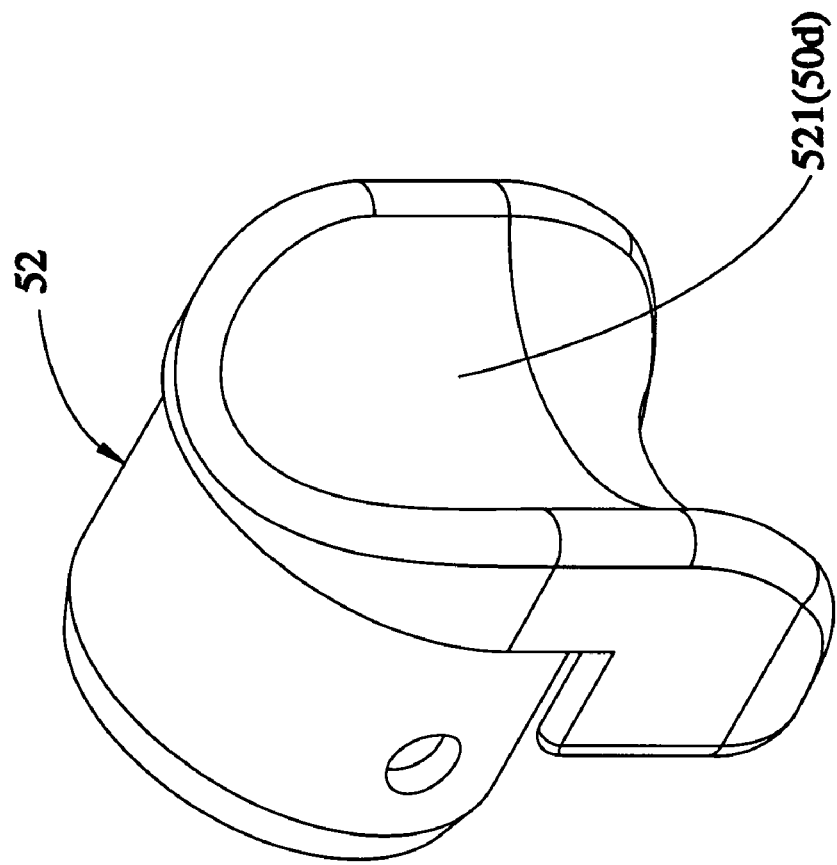
FIG. 5 is an enlarged view of the sliding cap shown in FIG. 4.
Figure 6:
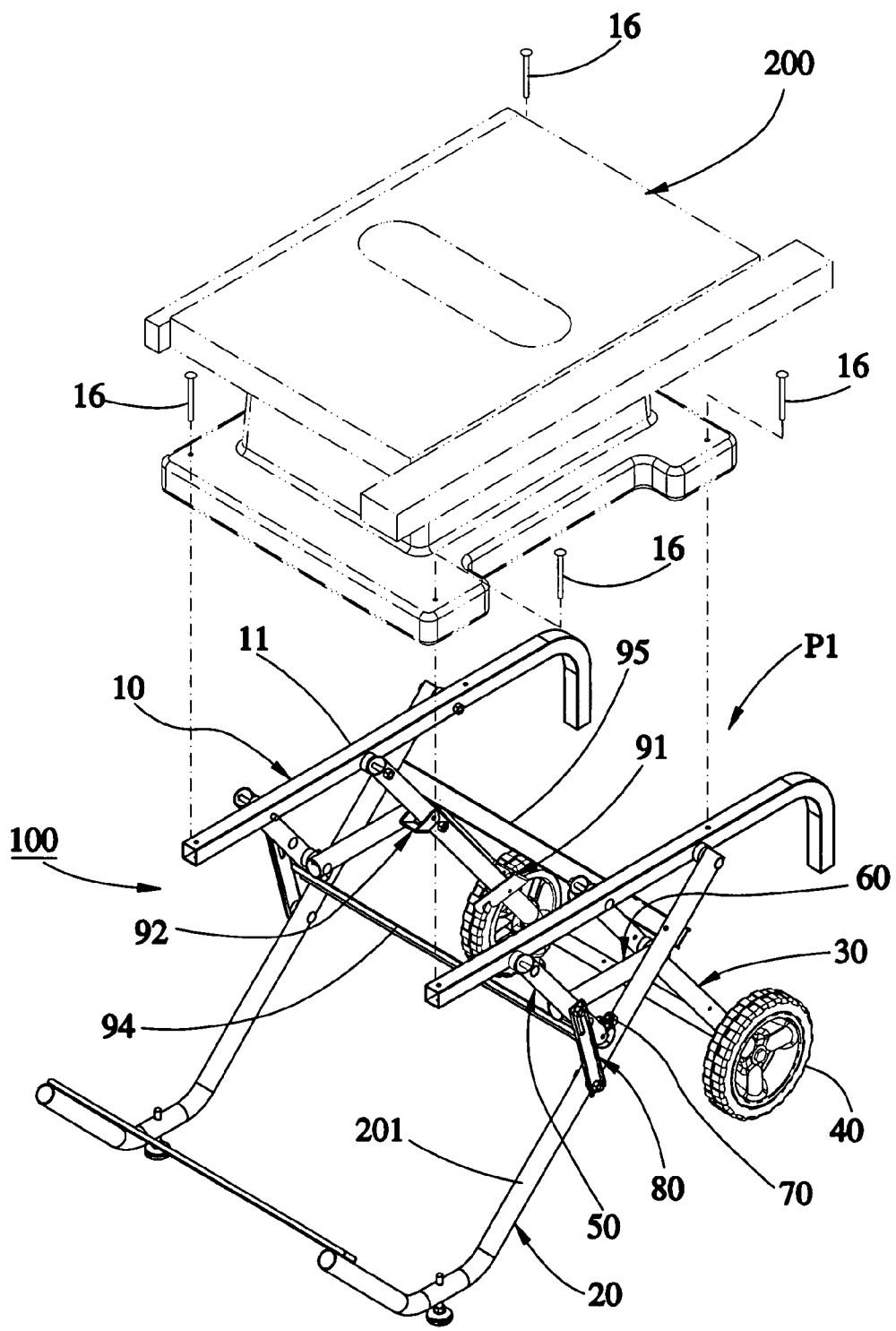
FIG. 6 is a perspective assembly view of the folding support in accordance with the preferred embodiment of the present invention.

To assure safety of the folding support 100 in the received or extended position, the lock 90 is used. As shown in FIGS. 4 and 7, the lock 90 includes a first retaining member 91, a second retaining member 92, a link 93, a first bridge member 94 and a second bridge member 95.

The first retaining member 91 and the second retaining member 92 are spacedly mounted on one same second leg 30, each having a front hook portion 91a or 92a. The first retaining member 91 further has a rear press portion 91b.

The link 93 is a rod member having one end pivoted to the first retaining member 91 near the press portion 91b and the other end pivoted to the second retaining member 92 near the hook portion 92b.

The first bridge member 94 is a flat bar having two distal ends respectively affixed to the first links 50. The second bridge member 95 is a flat bar, having two distal ends respectively affixed to the two first legs 20. The first bridge member 94 and the second bridge member 95 reinforce the connection stability between the first links 50 and the first legs 20.

When the folding support 100 is in the extended position P1, the hook portion 92a of the second retaining member 92 is hooked on the second bridge member 95 to prevent a scissoring action between the first legs 20 and the second legs 30, thereby assuring safety use of the folding support 100. When wishing to receive the folding support 100, press the press portion 91b of the first retaining member 91 with the foot to bias the first retaining member 91. At this time, the second retaining member 92 is simultaneously biased in the same direction due to the effect of the link 93, and therefore the hook portions 92a are disengaged from the second bridge members 95 (see FIG. 9), allowing folding of the folding support 100 into the received position (see FIGS. 10 and 11). When the wheels 40 are approaching the bearing portions 21 of the first legs 20, the smoothly arched outer surfaces of the hook portions 91a of the first retaining members 91 will guide the front ends of the retaining members 91 to move over the first bridge member 94. At this time, the front hook portion 91a of the first retaining member 91 is biased by the associating torsional spring 96 (see FIG. 4) and forced into engagement with the first bridge member 94 (see FIG. 12), thereby locking the folding support 100 in the received position P2 to prevent separation of the first legs 20 and the second legs 30. When the user presses the press portion 91b of the first retaining member 91 with the foot again, the front hook portion 91a of the first retaining member 91 is disengaged from the first bridge member 94, allowing the folding support 100 to be extended out again.

As stated above, the lock 90 automatically clocks the first legs 20 and the second legs 30 after the folding support 100 has been set in the extended or received position. Simply by pressing the press portion 91b with the foot, the lock 90 is unlocked, for allowing the folding support 100 to be extended out or received. Therefore, the use of the lock 90 eliminates the drawbacks of the T-shaped lock members 8 of the prior art.

Figure 14:
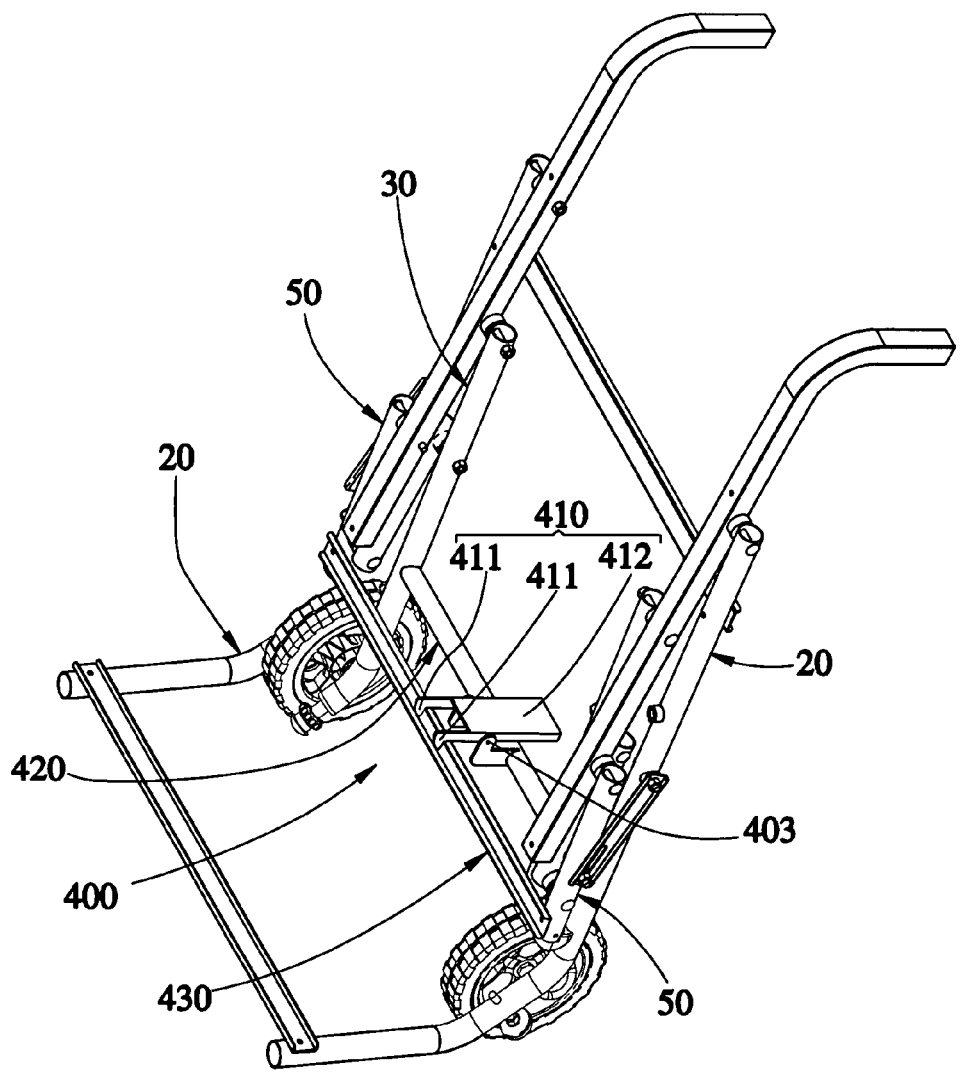
FIG. 14 is a perspective view showing an alternate form of the lock of present invention.

FIG. 14 shows an alternate form of the lock. According to this embodiment, the lock 400 comprises a retaining member 410, a bridge member 420, and a locating member 430. The bridge member 420 is connected between the two second legs 30. The locating member 430 is connected between the two first links 50. The retaining member 410 is pivoted to the bridge member 420 with a pin 403, having a front hook portion 411 and a rear press portion 412. When the first legs 20 and the second legs 30 are received together, the front hook portion 411 of the retaining member 410 is biased by a torsional spring (not shown) into engagement with the locating member 430, preventing separation of the first legs 20 and the second legs 30. When the user presses the press portion 412 with the foot, the front hook portion 411 is disengaged from the locating member 430, allowing the first legs 20 and the second legs 30 to be extended out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A folding support for supporting thereon a table machine, the folding support being alternatively settable between an extended position and a received position, the folding support comprising:
   a rack for the mounting of the table machine, said rack having a first pivot point, a second pivot point and a third pivot point orderly arranged at each of left and right sides thereof;
   a pair of first legs each having a first end respectively pivoted to one of the first pivot points of said rack, and a second end with a bearing portion for supporting on the floor;
   a pair of second legs each having a first end pivoted to one of the second pivot points of said rack, and a second end pivotally mounted with a wheel;
   a pair of first links each having a first end pivoted to one of said third pivot points of said rack, and a second end stopped against one of said first legs; and
   a pair of second links each having a first end pivoted to one of said first links close to the second end of said first link, and a second end pivoted to one of said second legs;
   wherein when said folding support is in said extended position, said first legs and said second legs are kept in a crossed manner to hold said rack in horizontal substantially; when said folding support is moved from said extended position toward said received position, said first links and said second links are moved with said second legs toward said first legs; when said folding support is in said received position, said wheels are kept close to the bearing portions of said first legs and said rack is kept in vertical substantially.

2. The folding support as claimed in claim 1, further comprising two connecting members each having a first end pivotally connected to a middle part of one of said first links by a first pin, and a second end pivotally connected to a middle part of one of said first legs by a second pin, said connecting members each having an elongated sliding slot for the passing of one of said first pins.

3. The folding support as claimed in claim 1, wherein said first links each comprise a bar member and a sliding cap, said bar members having first ends thereof respectively pivoted to the third pivot points of said rack, and second ends thereof respectively coupled to said sliding caps, said sliding cap having a contact surface disposed in contact with the associating first leg, said contact surface constituting the second end of the respective first link.

4. The folding support as claimed in claim 1, further comprising at least one stop member fixedly mounted on one of said first legs for stopping one of said first links to have each of said first links define with the associating first leg a 90° contained angle when the folding support is in said extended position.

5. The folding support as claimed in claim 1, wherein said rack comprises two transverse rods arranged in parallel for supporting thereon said table machine; one of said first pivot points, one of said second pivot points and one of said third pivot points are formed on one of said two transverse rods; said first legs and said first links are respectively pivoted to said transverse rods at an outer side of said transverse rods; said second legs are respectively pivoted to said transverse rods at an inner side of said transverse rods relative to said first legs and said first links.

6. The folding support as claimed in claim 5, wherein when said folding support is in said extended position, said first links are substantially kept in parallel to said second legs, and said second links are substantially kept in parallel to said transverse rods.

7. The folding support as claimed in claim 1, further comprising a lock having a first hook portion for holding said first legs and said second legs together when the folding support is in said received position.

8. The folding support as claimed in claim 7, wherein said lock comprises a retaining member, a bridge member and a locating member, said bridge member being connected between said two second legs, said locating member being connected between said two first links, said retaining member being pivoted to said bridge member and having a front end terminating into said first hook portion for hooking on said locating member when the folding support is in said received position.

9. The folding support as claimed in claim 7, wherein said lock further has a second hook portion for holding said first legs and said second legs in a crossed manner when the folding support is in said extended position.

10. The folding support as claimed in claim 9, wherein said lock comprises a first retaining member, a second retaining member, a first bridge member, and a second bridge member, said first retaining member and said second retaining member being pivotally mounted on one of said second legs, said first retaining member and said second retaining member each having a front end respectively terminating in said first hook portion and said hook portion, said first bridge member having two distal ends respectively affixed to said first links, said second bridge member having two distal ends respectively affixed to said two first legs, said first hook portion hooking said first bridge member when the folding support is in said received position, said second hook portion hooking said second bridge member when the folding support is in said extended position.

11. The folding support as claimed in claim 10, wherein said lock further comprises a link member and a spring member, said link member being coupled between said first retaining member and said second retaining member, said first retaining member having a press portion extending from one end thereof remote from said first hook portion, said spring member imparting a biasing force to said first retaining member in a predetermined direction; when the folding support is in said received position and an external force is applied to said press portion, said first hook portion is disengaged from said first bridge member; when the folding support is in said extended position and an external force is applied to said press portion, said second hook portion is disengaged from said second locating member.

* * * * *